United States Patent Office 2,970,511
Patented Feb. 7, 1961

2,970,511

LUMINOUS FRAME VIEWFINDER-RANGEFINDER

Hans Ruhle, Stuttgart, Germany, assignor to Zeiss Ikon A.G., Stuttgart, Germany

Filed Dec. 10, 1957, Ser. No. 701,900

Claims priority, application Germany Dec. 14, 1956

4 Claims. (Cl. 88—2.4)

The invention relates to luminous frame viewfinder-rangefinders, particularly for use in photographic cameras. In luminous frame viewfinder-rangefinders it is necessary to operate with optical elements disposed one behind the other, and which are partially pervious to light. One of these elements consists of a negative lens of the viewfinder objective (mirror-lens) which is provided on one face with a mirror layer, to form an image of the frame, while the other element consists of the measuring mirror of the rangefinder.

It is known to provide the mirror-lens with a mirror layer disposed only on its margin, and this marginal layer is of uniform thickness throughout its entire width, while the center portion of said mirror-lens remains free of any mirror layer. On the other hand, however, the measuring mirror is provided with a mirror layer covering only its center portion. This arrangement had the disadvantage that in connection with the out-of-focus viewing of the measuring mirror the transition zones have a very poor appearance which impairs the quality of the combined pictures appearing in the viewfinder-rangefinder.

It is an object of the present invention to overcome this disadvantage in that both the mirror-lens and also the measuring mirror are provided with mirror layers which gradually change in thickness over their entire areas. The margin of the lens face which projects the frame is provided with a thicker mirror layer than the center, while the center of the mirror layer on the measuring mirror is thicker than its marginal portion. When viewed, a satisfactory uniformity of the combined pictures will be observed, as well as a uniform weakening of the light intensity. The gradual change in the thickness of the mirror layer may be selected in such a manner that the center portion of the frame projecting mirror-lens is entirely devoid of any mirror layer. In case the mirror layer on the measuring mirror at the respective portion is then selected that it reflects 50% of the light and, accordingly, permits the passage of light in the same amount, then the combined and superimposed pictures will have evenly illuminated portions.

Figure 1:
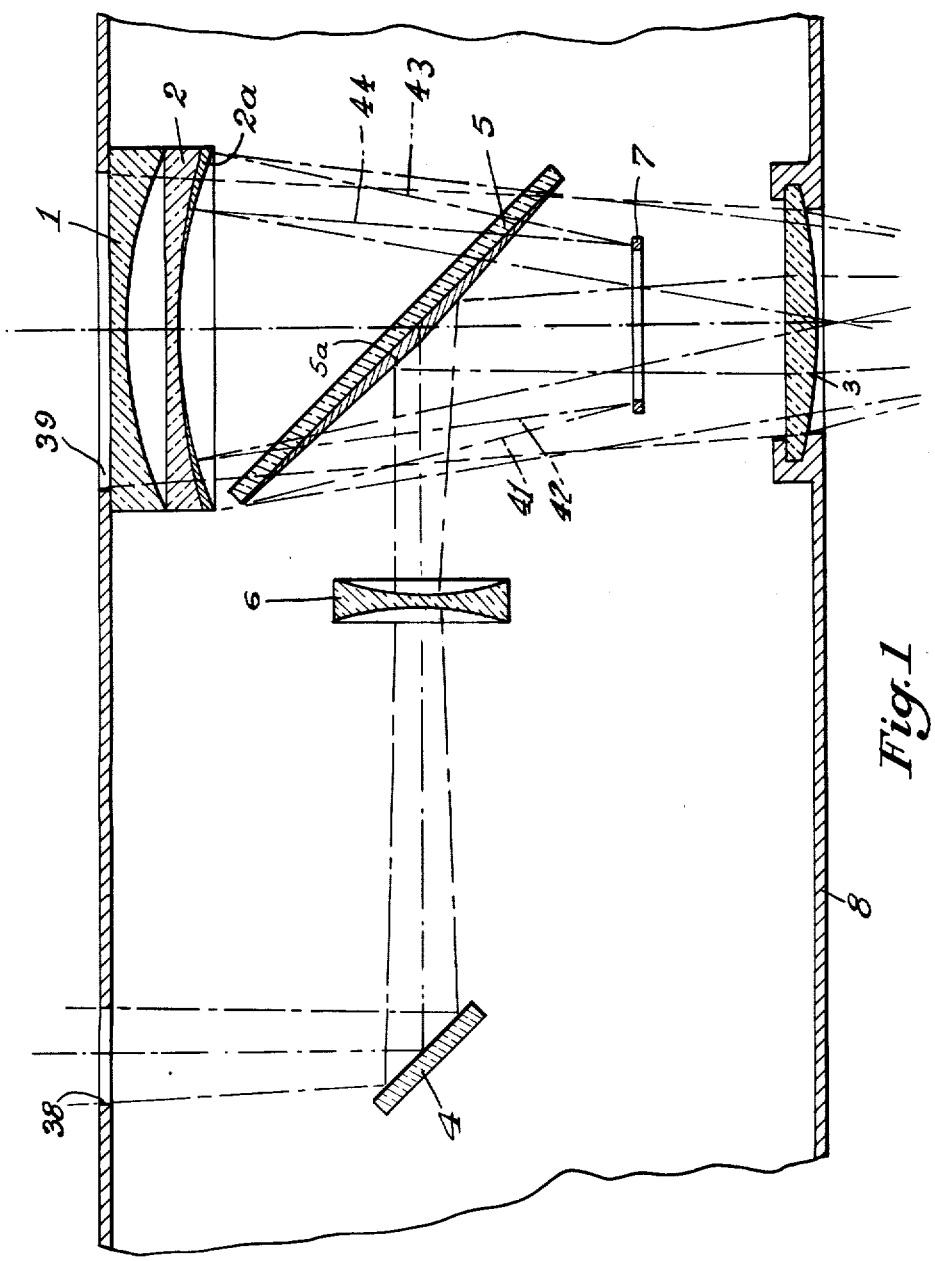
Figure 2:
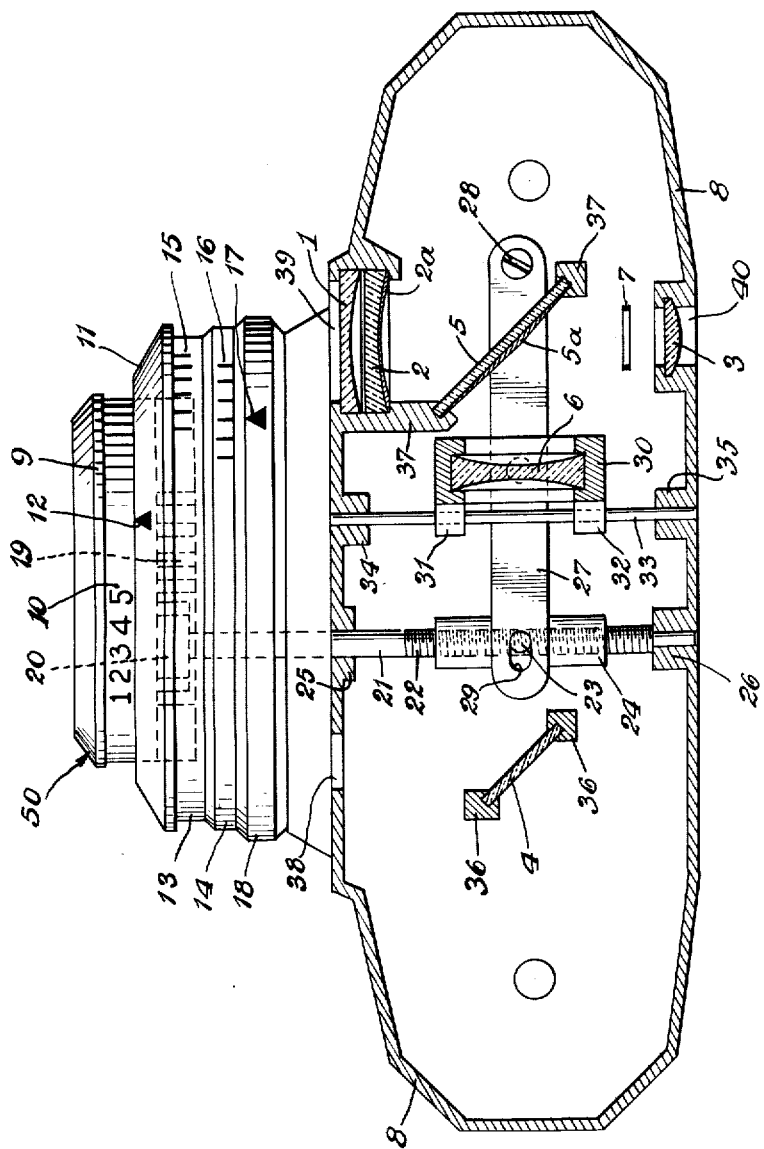

The present invention will now be described with reference to a preferred embodiment disclosed in the accompanying drawing, wherein:

Fig. 1 is a diagrammatic view of a viewfinder-rangefinder arranged in a camera casing, and Fig. 2 shows top view of a photographic camera, partly in horizontal section, whose camera objective is coupled with a viewfinder-rangefinder of the present invention.

In the drawing the viewfinder objective 1 is arranged in axial alignment with a mirror lens 2, and 3 designates the ocular of a Newton-finder consisting of a reversed Galilean telescope. The rangefinder consists of the two mirrors 4 and 5 and the measuring or slidable lens 6.

The objective of the Newton-finder preferably consists of two axially aligned negative lenses 1 and 2 disposed one behind the other. The concave surface of the lens 2 facing the ocular 3 is provided with a mirror layer 2a, so that the same may form thereon an image of a frame 7 which is disposed in the air space between the lens 2 and the ocular 3. The image of the frame will be clearly visible together with the object viewed by the eye looking into the ocular 3. As shown in Fig. 1, the mirror layer 2a on the lens 2 is formed in such a manner that its thickness gradually decreases from the outer edge of the lens 2 toward the center of the same; in fact the thickness of the mirror layer 2a in the center of the lens 2 may be reduced to zero. The measuring mirror 5 which is arranged in the air space between the frame 7 and the lens 2 is provided with a mirror layer 5a over its entire surface, but the thickness of this layer 5 in the center is of the greatest dimension and gradually decreases towards its outer edge or periphery. The main advantage obtained by said arrangement of the mirror layers is that the light conditions for the viewfinder and also for the rangefinder are very favorable because all sudden steps are eliminated, and the combined superimposed images are of the desired uniformity.

If, as indicated in the foregoing, in the preferred embodiment of the present invention, the entire mirror layer 2a on the lens 2 is reduced so rapidly from the peripheral zone towards the center, that the center portion of the lens 2 of the size of the measuring area remains free of any mirror layer, and if the center portion of the measuring mirror 5 has a perviousness of 50%, then the combination picture appearing in the finder system will have substantially evenly illuminated portions with a clearly visible image of the picture area limiting frame projected upon said combination picture.

Some of the light rays passing through the objective lenses 1 and 2 are reflected by the frame 7 onto the concave mirror surface of the lens 2 which reflects the light rays in such a manner that the same after passage through the ocular lens 3 form an image of the frame 7 appearing in infinity and which surrounds the finder area. The light rays which form an image of the frame 7 are indicated by the dashed and dotted lines 41, 42, and 43, 44 respectively.

The mirrors on the optical elements 2 and 5 may be produced by metallic layers or interference layers.

Referring to Fig. 2, the camera casing 8 has the parts 1 to 7 of viewfinder-rangefinder built into its upper part. The camera objective 50 is provided with a focusing ring 9 carrying a distance scale 10. A stationary ring 11 on the camera objective carries the distance indicating index mark 12. The diaphragm aperture adjusting ring 13 is provided with a diaphragm scale 15, and the shutter speed adjusting ring 14 is provided with a shutter speed scale 16. A common index mark 17 for these scales 15 and 16 is arranged on the stationary ring 18.

The focusing or distance adjusting member 9 is provided on its circumference, respectively on a portion of its circumference, with a gear segment 19 which is in engagement with a pinion 20. The gear segment 19 is of such a width that even in case the member 9 is displaced in the direction of the optical axis during the focusing operation, a continuous engagement of the segment 19 with the pinion 20 is assured. A shaft 21 is provided with a threaded portion 22 upon which a nut 24 carrying an outwardly extending pin 23 is arranged. The threaded shaft 21 is supported in bearings 25 and 26. A lever arm 27 is rotatably supported at one of its ends at 28, and the other end of the arm 27 is provided with an elongated aperture 29 engaging the pin 23. The lever arm 27 is connected between its ends with the mount 30 of the slidable rangefinder lens 6. The slidable lens 6 constitutes in the present case the ray deflecting member of the rangefinder. The lens mount 30 is provided with sleeves 31, 32 which enable the mount 30 and therewith the lens 6 to slide along a rod 33 when the lever 27 is oscillated. Numerals 34 and 35 designate supporting points for the ends of said rod 33. The mirror 5 is mounted in brackets 37 in the casing 8, and the mirror 4 is supported in brackets 36. The camera casing 8 is provided with light inlet apertures 38 and 39 for the rangefinder and viewfinder, and the ocular lens 3 is mounted in the aperture 40.

When the focusing ring 9 is rotated, the rotary movement is transmitted by the segment 19 and the pinion 20 to the shaft 21, which carries the threaded portion 22 and the nut 24, which latter is then moved parallel to the optical axis of the camera objective 50. The last named movement will then, over the pin and slot connection 23, 29, produce a swinging movement of the lever 27 about its pivot point 28. Due to the operative connection of the lens mount 30 with the lever 27 the lens 6 will be moved along the rod 33. The connection between the focusing device of the camera objective 50 and the rangefinder is such that the coincidence in the rangefinder for the object to be photographed is achieved when the camera objective 50 is sharply focused onto said object.

In place of the lens 6, other optical members of the rangefinder such as, for instance, the mirrors 4 or 5 could be made rotatably adjustable and could be coupled with the focusing member 9 on the camera objective.

What I claim is:

1. A luminous frame viewfinder-rangefinder including a casing, means within said casing forming a viewfinder, said means including an objective, a mirror lens having a concave reflecting surface and an ocular all arranged in axial alignment, said mirror lens being directed with its concave reflecting surface toward said ocular, said reflecting surface being formed by a light preserving mirror layer decreasing in thickness gradually from the circumference of said lens toward the center thereof, a picture area limiting frame arranged in the air space between said mirror lens and said ocular, and means forming a rangefinder in said casing and including two mirrors forming the base of said rangefinder and a lens therebetween, said base extending substantially at right angles to the axis of said viewfinder, one of said mirrors being arranged between said frame and said mirror lens at an angle with respect to the optical axis of said viewfinder, said one mirror being pervious to light and having a mirror layer thereon the thickness of which decreases gradually from the center of the mirror toward the outer edge thereof.

2. A luminous frame viewfinder-rangefinder including a casing, means within said casing forming a viewfinder, said means including an objective, a mirror lens having a concave reflecting surface and an ocular all arranged in axial alignment, said mirror lens being directed with its concave reflecting surface toward said ocular, said reflecting surface being formed by a light preserving mirror layer decreasing in thickness gradually from the circumference of said lens toward the center thereof, the central portion of said lens having an area of the size of the measuring field of the rangefinder and is without any mirror layer, a picture limiting frame arranged in the air space between said mirror lens and said ocular, and means forming a rangefinder in said casing and including two mirrors forming the base of said rangefinder and a lens therebetween, said base extending substantially at right angles to the axis of said viewfinder, one of said mirrors being arranged between said frame and said mirror lens at an angle with respect to the optical axis of said viewfinder, said one mirror being pervious to light and having a mirror layer thereon the thickness of which decreases gradually from the center of the mirror toward the outer edge thereof.

3. A luminous frame viewfinder-rangefinder including a casing, means within said casing forming a viewfinder, said means including an objective, a mirror lens having a concave reflecting surface and an ocular all arranged in axial alignment, said mirror lens being directed with its concave reflecting surface toward said ocular, said reflecting surface being formed by a light preserving mirror layer decreasing in thickness gradually from the circumference of said lens toward the center thereof, the central portion of said lens having an area of the size of the measuring field of the rangefinder and is without any mirror layer, a picture limiting frame arranged in the air space between said mirror lens and said ocular, and means forming a rangefinder in said casing and including two mirrors forming the base of said rangefinder and a lens therebetween, said base extending substantially at right angles to the axis of said viewfinder, one of said mirrors being arranged between said frame and said mirror lens at an angle with respect to the optical axis of said viewfinder, said one mirror being pervious to light and having a mirror layer thereon the thickness of which decreases gradually from the center of the mirror toward the outer edge thereof, the center portion of said one mirror having such a perviousness as to transmit 50% of the light.

4. A luminous frame viewfinder-rangefinder as claimed in claim 1, in which said mirror layers are made of metallic substances.

References Cited in the file of this patent

UNITED STATES PATENTS

| 2,187,957 | Sauer | Jan. 16, 1940 |

FOREIGN PATENTS

| 558,417 | Germany | Sept. 7, 1932 |
| 454,064 | Great Britain | Sept. 23, 1936 |
| 905,573 | Germany | Mar. 4, 1954 |